(12) United States Patent
Acar et al.

(10) Patent No.: US 7,284,430 B2
(45) Date of Patent: Oct. 23, 2007

(54) ROBUST MICROMACHINED GYROSCOPES WITH TWO DEGREES OF FREEDOM SENSE-MODE OSCILLATOR

(75) Inventors: Cenk Acar, Irvine, CA (US); Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 11/204,900

(22) Filed: Aug. 15, 2005

(65) Prior Publication Data
US 2007/0034005 A1    Feb. 15, 2007

(51) Int. Cl.
*G01P 9/04*    (2006.01)
(52) U.S. Cl. .................. 73/504.12; 73/504.14
(58) Field of Classification Search ............. 73/504.12, 73/504.14
See application file for complete search history.

(56) References Cited

U.S. PATENT DOCUMENTS

| | | | |
|---|---|---|---|
| 6,293,148 B1* | 9/2001 | Wang et al. | 73/504.12 |
| 6,393,913 B1* | 5/2002 | Dyck et al. | 73/504.12 |
| 6,691,571 B2* | 2/2004 | Willig et al. | 73/504.12 |
| 2004/0149035 A1* | 8/2004 | Acar et al. | 73/504.12 |

* cited by examiner

*Primary Examiner*—John E. Chapman
(74) *Attorney, Agent, or Firm*—Myers Dawes Andras & Sherman LLP

(57) ABSTRACT

A three-degrees of freedom (DOF) MEMS inertial micromachined gyroscope with nonresonant actuation with a drive direction, sense direction and a direction perpendicular to the drive and sense directions comprises a planar substrate, a 2-DOF sense-mode oscillator coupled to the substrate operated at a flattened wide-bandwidth frequency region, and a 1-DOF drive mode oscillator coupled operated at resonance in the flattened wide-bandwidth frequency region to achieve large drive-mode amplitudes.

14 Claims, 12 Drawing Sheets

ROBUST MICROMACHINED GYROSCOPES WITH TWO DEGREES OF FREEDOM SENSE-MODE OSCILLATOR

BACKGROUND OF THE INVENTION

1. Field of the Invention

The invention relates to the field of micromachined gyroscopes, and in particular to inertial micromachined transducers for measurement of angular rotation rate of an object.

2. Description of the Prior Art

Even though an extensive variety of micromachined gyroscope designs and operation principles exists, almost all of the reported micromachined gyroscopes use vibrating mechanical elements to sense angular rate. The concept of utilizing vibrating elements to induce and detect Coriolis force involves no rotating parts that require bearings, and have been proven to be effectively implemented and batch fabricated in different micromachining processes.

The operation principle of the vast majority of all existing micromachined vibratory gyroscopes relies on the generation of a sinusoidal Coriolis force due to the combination of vibration of a proof-mass and an orthogonal angular-rate input. The proof mass is generally suspended above the substrate by a suspension system consisting of flexible beams. The overall dynamical system is typically a two degrees-of-freedom (two DOF) mass-spring-damper system, where the rotation-induced Coriolis force causes energy transfer to the sense-mode proportional to the angular rate input.

In most of the reported micromachined vibratory rate gyroscopes, the proof mass is driven into resonance in the drive direction by an external sinusoidal electrostatic or electromagnetic force. When the gyroscope is subjected to an angular rotation, a sinusoidal Coriolis force is induced in the direction orthogonal to the drive-mode oscillation at the driving frequency. Ideally, it is desired to utilize resonance in both the drive and the sense modes in order to attain the maximum possible response gain, and hence sensitivity. This is typically achieved by designing and electrostatically tuning the drive and sense resonant frequencies to match.

Alternatively, the sense-mode is designed to be slightly shifted from the drive-mode to improve robustness and thermal stability, while intentionally sacrificing gain and sensitivity. However, the limitations of the photolithography-based micromachining technologies define the upper-bound on the performance and robustness of micromachined gyroscopes. Conventional gyroscopes based on exact or close matching the drive and sense modes are extremely sensitive to variations in oscillatory system parameters that shift the natural frequencies and introduce quadrature errors, and require compensation by advanced control architectures.

Micromachined gyroscopes are projected to become a potential alternative to expensive and bulky conventional inertial sensors in the near future. High-performance gyroscopic sensors including precision fiber-optic gyroscopes, ring laser gyroscopes, and conventional rotating wheel gyroscopes are too expensive and too large for use in most emerging applications. With micromachining processes allowing mass-production of micro-mechanical systems on a chip together with their control and signal conditioning electronics, low-cost and micro-sized gyroscopes will provide high accuracy rotation measurements.

Moreover, advances in the fabrication techniques allow the detection and control electronics to be integrated on the same silicon chip together with the mechanical sensor elements. Thus, miniaturization of vibratory gyroscopes with innovative micro-fabrication processes and gyroscope designs is expected to become an attractive solution to current inertial sensing market needs, as well as open new market opportunities. With their dramatically reduced cost, size, and weight, MEMS gyroscopes potentially have a wide application spectrum in the aerospace industry, military, automotive industry and consumer electronics market. The automotive industry applications are diverse, including high performance navigation and guidance systems, ride stabilization, advanced automotive safety systems like yaw and tilt control, roll-over detection and prevention, and next generation airbag and anti-lock brake systems. A very wide range of consumer electronics applications include image stabilization in video cameras, virtual reality products, inertial pointing devices, and computer gaming industry. Miniaturization of gyroscopes also enable higher-end applications including micro-satellites, micro-robotics, and even implantable devices to cure vestibular disorders.

The tolerancing capabilities of the current photolithography processes and micro-fabrication techniques are inadequate compared to the requirements for production of high-performance inertial sensors. The resulting inherent imperfections in the mechanical structure significantly limits the performance, stability, and robustness of MEMS gyroscopes. Thus, fabrication and commercialization of high-performance and reliable MEMS gyroscopes that require picometer-scale displacement measurements of a vibratory mass have proven to be extremely challenging.

In the conventional micromachined rate gyroscopes, the mode-matching requirement renders the system response very sensitive to variations in system parameters due to fabrication imperfections and fluctuations in operating conditions. Inevitable fabrication imperfections affect both the geometry and the material properties of MEMS devices, and shift the drive and sense-mode resonant frequencies. The dynamical system characteristics are observed to deviate drastically from the designed values and also from device to device, due to slight variations is photolithography steps, etching processes, deposition conditions or residual stresses. Variations in the temperature of the structure also perturb the dynamical system parameters due to the temperature dependence of Young's Modulus and thermally induced localized stresses.

Extensive research has focused on design of symmetric suspensions and resonator systems that provide mode-matching and minimize temperature dependence. Various symmetric gyroscope designs based on enhancing performance by mode-matching have been reported. However, especially for lightly-damped devices, the requirement for mode-matching is well beyond fabrication tolerances; and none of the symmetric designs can provide the required degree of mode-matching without active tuning and feedback control under the presence of the mentioned perturbations. Also the gain is affected significantly by fluctuations in damping conditions, which makes the device very vulnerable to any possible vacuum leak in the package.

Fabrication imperfections also introduce anisoelasticities due to extremely small imbalances in the gyroscope suspension. This results in mechanical interference between the modes and undesired mode coupling often much larger than the Coriolis motion. In order to suppress coupled oscillation and drift, various devices have been reported employing independent suspension beams for the drive and sense modes. Consequently, the current state of the art micromachined gyroscopes require an order of magnitude improvement in performance, stability, and robustness. Fabrication imperfections and variations, and fluctuations in the ambient temperature or pressure during the operation time of these devices introduce significant errors, which have to be compensated by advanced control architectures.

BRIEF SUMMARY OF THE INVENTION

The illustrated embodiment of the invention show a robust micromachined gyroscope with a two degrees-of-freedom (DOF) sense mode oscillator, which gyroscope addresses two major MEMS gyroscope design challenges: (1) the requirement of precisely matching drive and sense resonance modes, and (2) inherent instability and drift due to mechanical coupling between the drive and sense modes. The device measures angular rate of an object with respect to the axis normal to the substrate plane (the z-axis).

One of the major differences of the illustrated embodiment of the invention from prior art micromachined gyroscopes is that the sense-mode oscillator is a two-DOF dynamical system comprised of two interconnected proof-masses. The two-DOF sense-mode oscillator provides a frequency response with two resonant peaks and a flat region between the peaks, instead of a single resonance peak as in conventional gyroscopes. The device is nominally operated in the flat region of the sense-mode response curve, where the gain is less sensitive to parameter fluctuations.

Furthermore, the sensitivity is improved by utilizing dynamical amplification of oscillations in the two-DOF sense-mode oscillator. To eliminate the limitations of the existing micromachined gyroscopes including high sensitivity to variations in system parameters and narrow bandwidth, complexity of the control electronics can be shifted to complexity in the dynamical system. Thus, increased bandwidth and reduced sensitivity to structural and thermal parameter fluctuations and damping changes are achieved, leading to improved robustness and long-term stability over the operating time of the device. Prototype gyroscopes were fabricated using a bulk-micromachining process, and were successfully operated in the flat region of the sense-mode.

The performance and robustness of the device have been experimentally evaluated. With a 25V DC bias and 3V AC drive signal resulting in 5.8 μm drive-mode amplitude, the gyroscope exhibited a measured noise-floor of 0.640/s/pHz over 50 Hz bandwidth in atmospheric pressure. The sense-mode response in the flat operating region was also experimentally demonstrated to be inherently insensitive to pressure, temperature and DC bias variations.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment is a robust micromachined gyroscope 10 with a two degrees-of-freedom sense-direction oscillator 12. The gyroscope 10 differs from all existing micromachined gyroscopes:

(1) In having a two-DOF sense-direction oscillator 12, forming an overall three-DOF vibratory dynamical system. Existing micromachined vibratory gyroscopes consist of a single-mass 1-DOF sense-direction oscillator, forming an overall two DOF dynamical system.

(2) In providing a flat operation region between two resonance peaks in the frequency response curve of the two DOF sense-direction oscillator 12. Operating the device in the flat region ensures that the oscillation amplitude and phase are insensitive to parameter fluctuations. Thus the device has improved robustness to fabrication variations, fluctuations in residual stresses, variations in elastic modulus from run to run, and also thermal fluctuations throughout the operation time.

(3) In utilizing dynamical amplification of vibration in the two DOF sense-mode oscillator 12 without requiring the system to operate in resonance mode, in contrast to existing gyroscopes that achieve high gain by operation in or near resonance; resulting in reduced sensitivity to structural and thermal parameter fluctuations and damping changes.

(4) In having the drive direction oscillator 14 and sense direction oscillator 12 mechanically decoupled, minimizing instability and zero-rate drift due to dynamical coupling between the drive and sense modes.

(5) In having compatibility with well-proven drive-mode control techniques, while the effect of parameter variations on the gain and phase of the sense-mode response is significantly suppressed.

In the three DOF gyroscope structure with two DOF sense-mode, the device 10 is operated at resonance in the drive-mode to achieve large drive-mode amplitudes, and the wide-bandwidth frequency region is obtained in the sense-mode frequency response. This allows utilization of well-proven drive-mode control techniques, while providing robust gain and phase in the sense-mode.

Figure 1B:
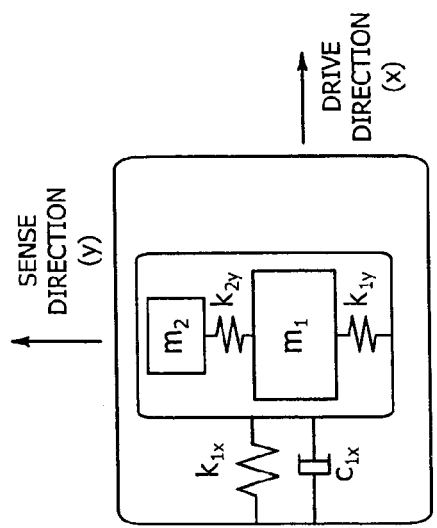
FIGS. 1a and 1b are graphic comparisons of the single-mass conventional gyroscopes and the illustrated robust micromachined gyroscope with two DOF sense-mode oscillator respectively.
Figure 1B:
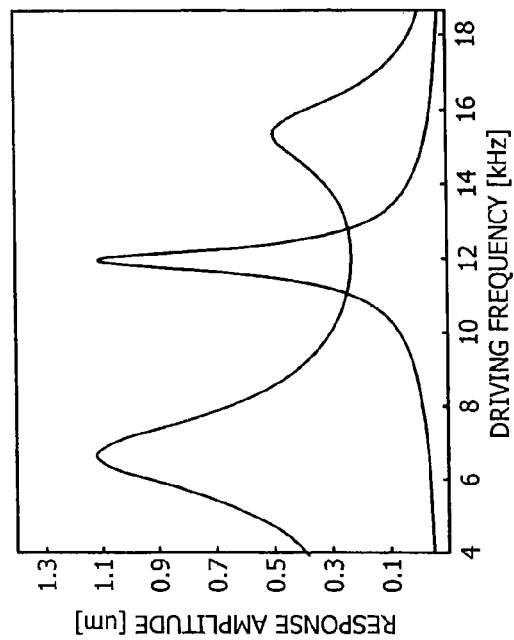
Figure 1A:
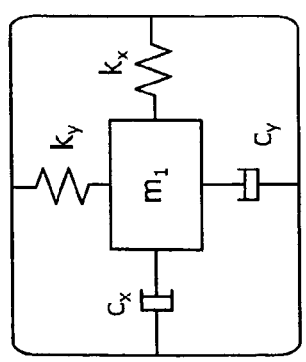
Figure 1A:
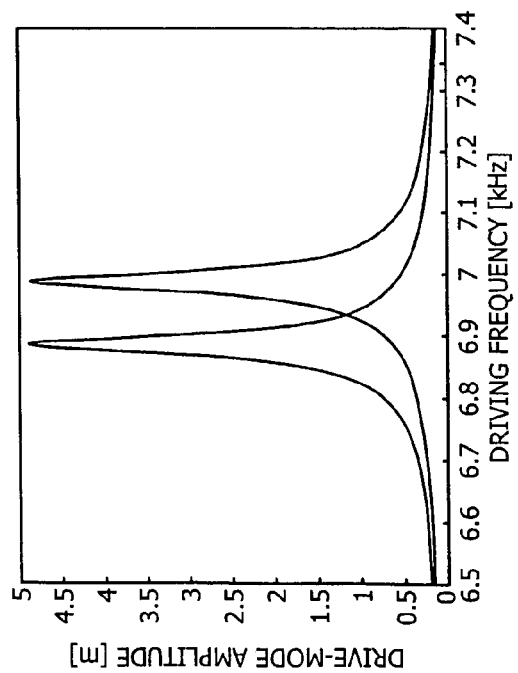
Figure 2:
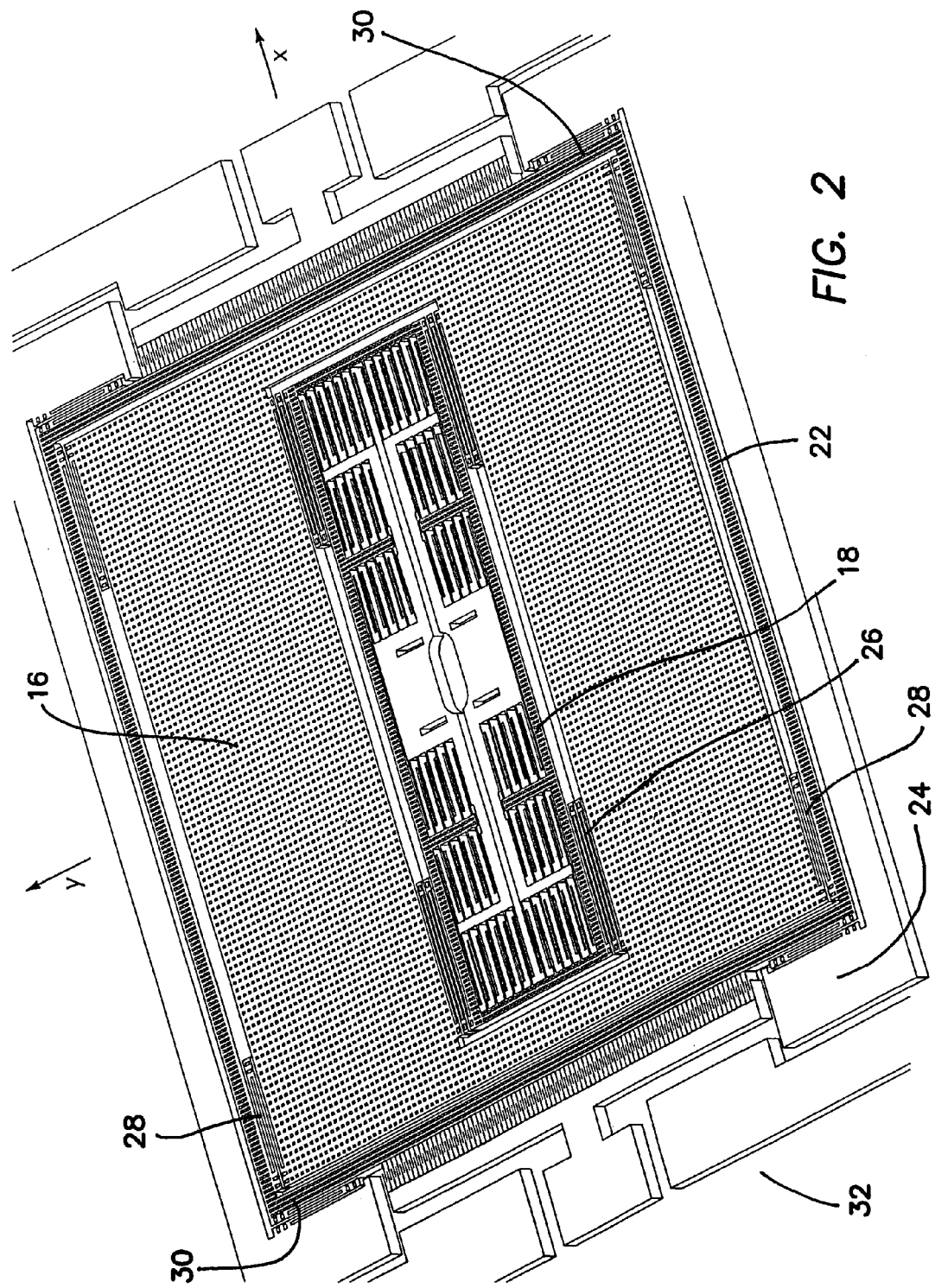
FIG. 2 is a scanning electron micrograph of a bulk-micromachined three DOF gyroscope with two DOF sense-mode according to the invention.
Figure 3:
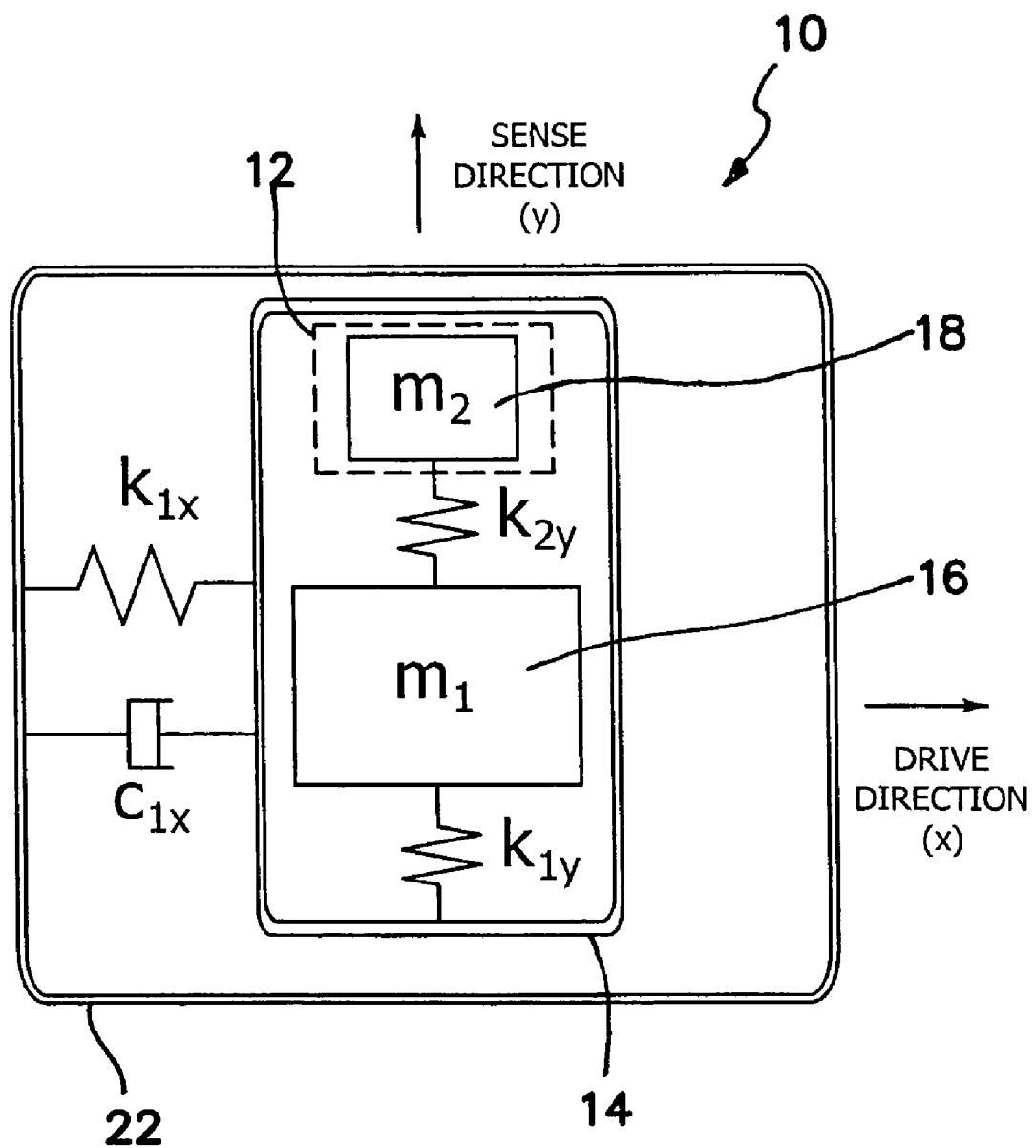
FIG. 3 is a diagram showing a lumped mass-spring-damper model of the overall three DOF gyroscope with two DOF sensemode.
Figure 5:
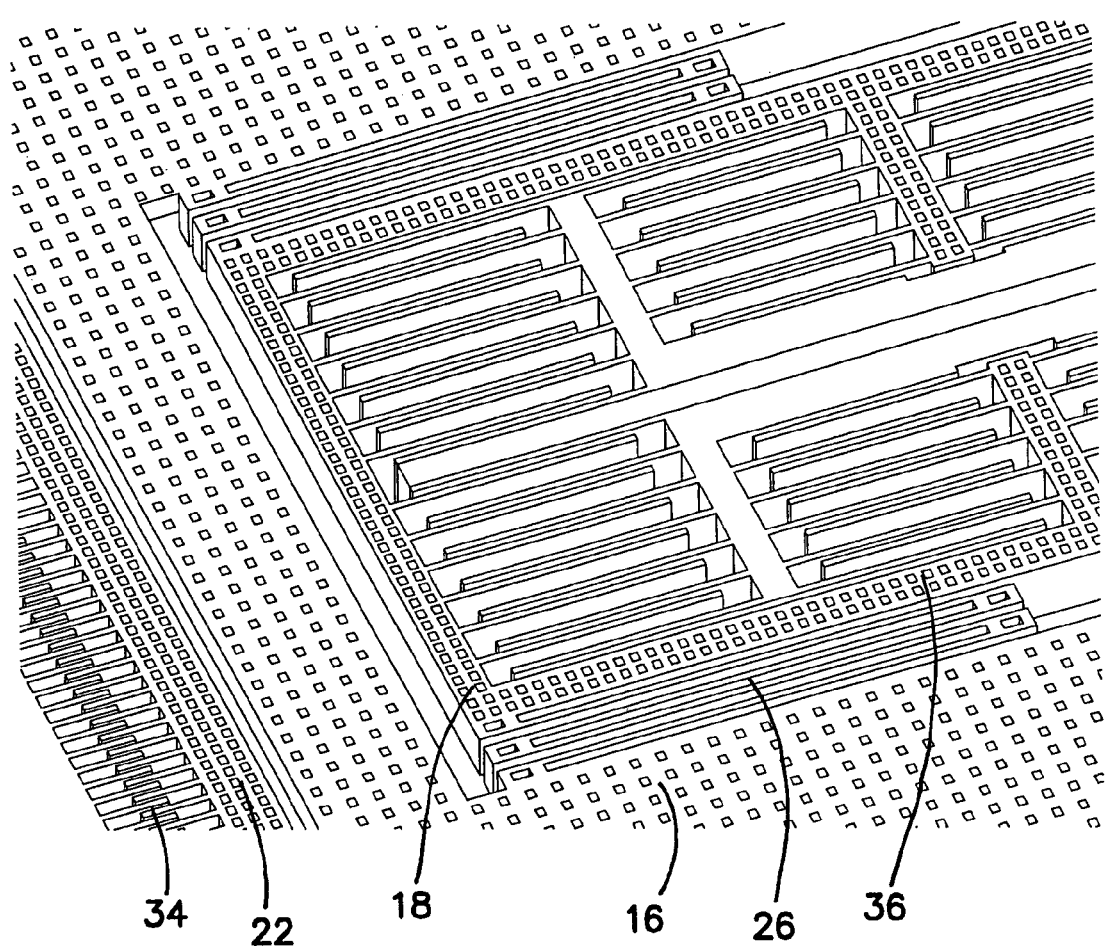
FIG. 5 is a scanning electron micrograph of the sense-mode passive mass $m_2$ and the differential sensing electrodes.

The gyroscope dynamical system of the illustrated embodiment is comprised of a two DOF sense-mode oscillator 12 and a 1-DOF drive-mode oscillator 14, formed by two interconnected proof masses as illustrated in the microphotograph of FIG. 2. Mass 16 is coupled by flexures 28 to a frame 22, which in turn is coupled by flexures 30 to an anchor 24 fixed to a substrate 32. Mass 18 is coupled by means of flexures 26 to mass 16. Masses 16 and 18 are generally planar and arranged to be generally parallel to planar substrate 32. The first mass 16, ($m_1$), is free to oscillate both in the drive and sense directions, x and y respectively, and is excited or driven by drive electrodes 34 coupled to frame 22 in the x drive direction. The second mass 18, ($m_2$), is constrained from vibrating in the x drive direction with respect to the first mass 16. Thus, mass 18, $m_2$, forms the passive mass of the two DOF sense-mode oscillator 12 as diagrammatically depicted in FIG. 3, and acts as the vibration absorber to dynamically amplify the sense mode oscillations of mass 16, $m_1$. In the x drive-direction, masses 16 and 18, $m_1$ and $m_2$, oscillate together, and form a resonant 1-DOF oscillator 14. Vibration or oscillation of mass 18 is detected by sense electrodes 36 best seen in FIG. 5.

Since the gyroscope structure oscillates as a 1-DOF resonator in the x drive direction, the frequency response of the device 10 has a single resonance peak in the drive-mode. The device 10 is operated at resonance in the drive-mode. Thus, the flat region of the sense-mode oscillator 12 is designed to coincide with the drive-mode resonant frequency. Drive mode oscillator 14 is driven by conventional electrostatic drive electrodes (not shown) and sense mode oscillator 12 is sensed by conventional capacitive plate sensing electrodes (not shown), which will not be further detailed.

Figure 4:
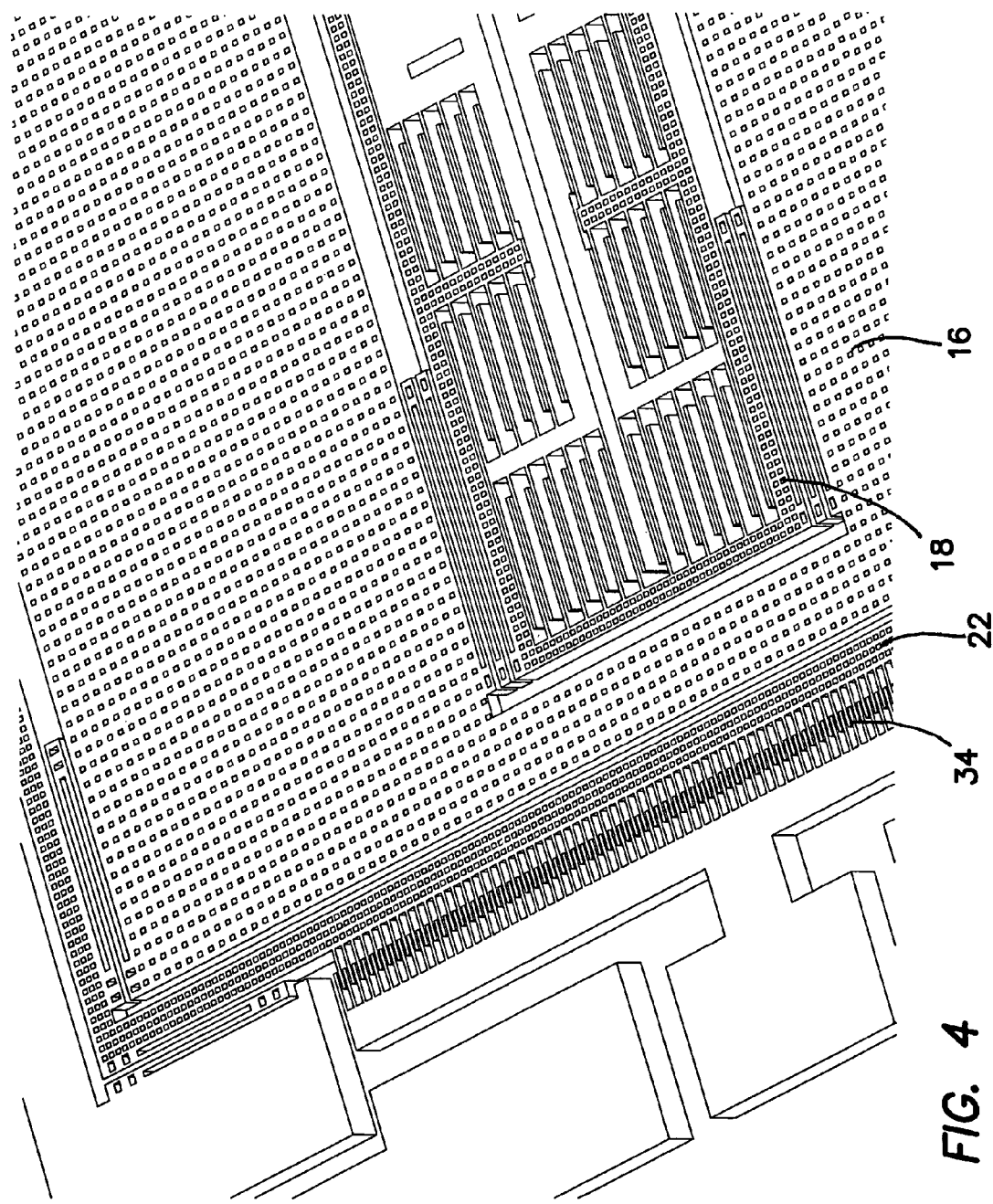
FIG. 4 is a scanning electron micrograph of the frame implementation of the invention for decoupling the drive and sense-mode oscillations of $m_1$.

Consider now the mode-decoupling realized in the illustrated embodiment. The drive direction oscillations and sense direction oscillation of mass 16, $m_1$, can be mechanically decoupled by using a frame structure 22, in order to minimize quadrature error and undesired electrostatic forces in the sense-mode due to drive-mode actuator imperfections. When mass 16, $m_1$, is nested inside a drive mode frame as shown in the micrograph of FIG. 4, and when the sense-direction oscillations of the frame 22 are constrained, the drive-direction oscillations are automatically forced to be in the designed x drive direction. Thus, possible anisoelasticities due to fabrication imperfections are suppressed. Since mass 16, $m_1$, is free to oscillate only in the y sense-direction with respect to the frame 22, the sense-mode response of mass 16, $m_1$, is assured to be perfectly orthogonal to the drive-direction.

Consider now the gyroscope dynamics. The following constraints define the dynamics of the three DOF system with two DOF sense-mode: The structure of device 10 is stiff in the out-of-plane direction; the position vector of the decoupling frame 22 is forced to lie along the x drive-direction; mass 16, $m_1$, oscillates purely in the y sense-direction relative to the decoupling frame 22; masses 16 and 18, $m_1$ and $m_2$, move together in the drive direction; and mass 18, $m_2$, oscillates purely in the y sense-direction relative to $m_1$. Thus, the equations of motion of masses 16 and 18, $m_1$ and $m_2$, are decomposed into the x drive and y sense directions, and become $$(m_1+m_2+m_f)\ddot{x}_1+c_{1x}\dot{x}_1+k_{1x}x_1=(m_1+m_2+m_f)\Omega_z^2 x_1+F_d(t) \quad (1)$$

$$m_1\ddot{y}_1+c_{1y}\dot{y}_1+k_{1y}y_1=k_{2y}(y_2-y_1)+m_1\Omega_z^2 y_1-2m_1\Omega_z\dot{x}_1-m_1\dot{\Omega}_z x_1 \quad (2)$$

$$m_2\ddot{y}_2+c_{2y}\dot{y}_2+k_{2y}y_2=k_{2y}y_1+m_2\Omega_z^2 y_2-2m_2\Omega_z\dot{x}_2-m_2\dot{\Omega}_z x_2 \quad (3)$$

where z is the z-axis angular rate, $m_f$ is the mass of the decoupling frame, $F_d(t)$ is the driving electrostatic force applied to the active mass at the driving frequency $\omega_d$ and where the subscripts refer to the masses and position coordinates (x, y) and their derivatives of masses 16 and 18, $m_1$ and $m_2$, respectively. The Coriolis force that excites masses 16 and 18, $m_1$ and $m_2$, in the y sense direction is $2m_1\Omega_z dx_2/dt$, and the Coriolis response of mass 18, $m_2$, in the y sense-direction ($y_2$) is detected for angular rate measurement.

Turn now to the experimental evaluation of a bulk-micromachined embodiment. The dynamical system parameters in the present illustration of the three DOF gyroscope 10 with two DOF sense mode are following: The proof mass values are $m_1=2.46\times10^{-6}$ kg, $m_2=1.54\times10^{-7}$ kg, and the decoupling frame mass $m_f=1.19\times10^{-7}$ kg. The spring constants are $k_{1x}=61.2$ N/m, $k_{1y}=78.4$ N/m, and $k_{2y}=3.36$ N/m.

For the 1-DOF drive-mode oscillator, the effective proof-mass value becomes $m_{1x}=(m_1+m_2+m_f)=2.74\times10^{-6}$ kg. This yields a drive-mode resonant frequency of 752 Hz.

In the sense-mode, the resonant frequencies of the isolated active and passive mass-spring systems are $\omega_{1y}=\sqrt{(k_{1y}/m_1)}=897.7$ Hz and $\omega_{2y}=\sqrt{(k_{2y}/m_2)}=732.2$ Hz, respectively; yielding a frequency ratio of $\gamma_y=\omega_{1y}=0.897$, and a mass ratio of $\mu_x=m_2/m_1=0.0624$. With these parameters, the location of the two expected resonance peaks in the sense-mode frequency response were calculated as $f_{y-n1}=696.7$ Hz and $f_{y-n2}=943.3$ Hz, based on the relation $$\omega_{y-n1}=\sqrt{\frac{1}{2}\left(1+\mu_y+\frac{1}{\gamma_y^2}-\sqrt{\left(1+\mu_y+\frac{1}{\gamma_y^2}\right)^2-\frac{4}{\gamma_y^2}}\right)}\,\omega_{2y} \quad (4)$$

$$\omega_{y-n2}=\sqrt{\frac{1}{2}\left(1+\mu_y+\frac{1}{\gamma_y^2}+\sqrt{\left(1+\mu_y+\frac{1}{\gamma_y^2}\right)^2-\frac{4}{\gamma_y^2}}\right)}\,\omega_{2y} \quad (5)$$

Figure 6:
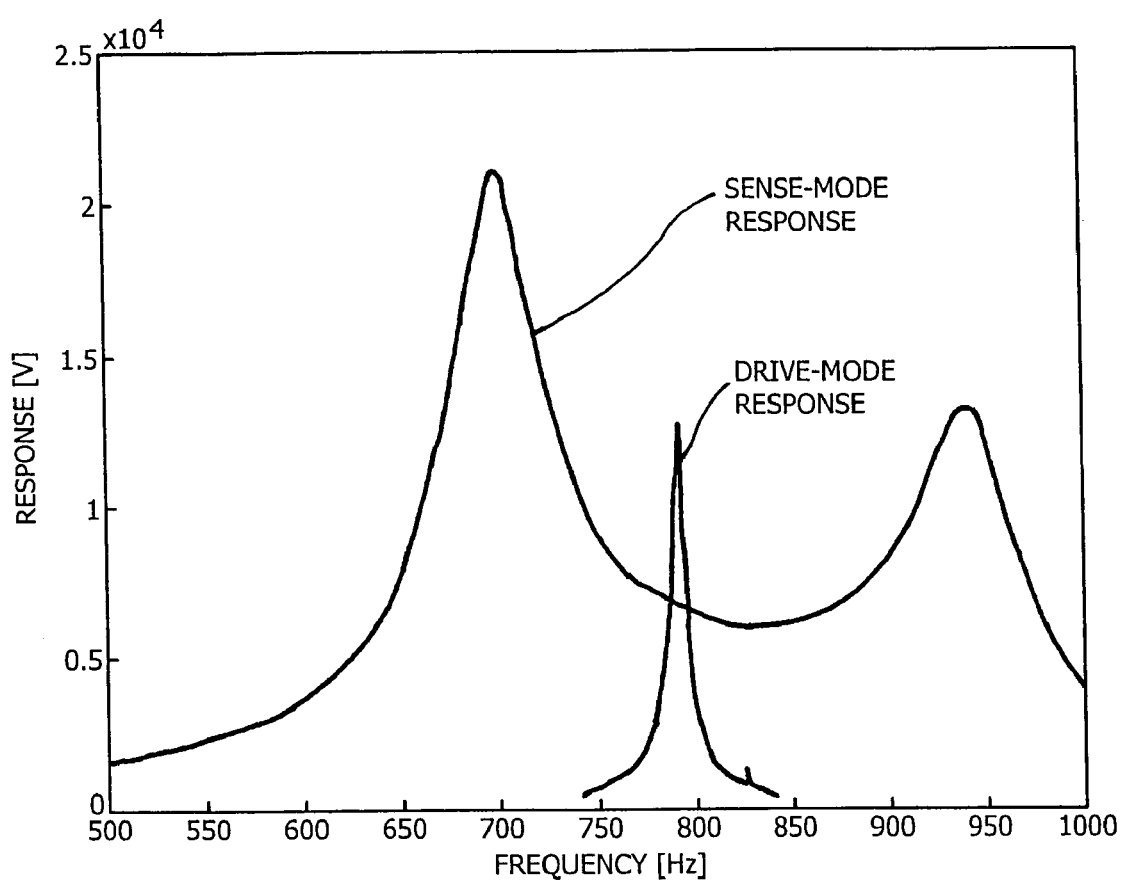
FIG. 6 is a graph of the experimental measurements of the drive and sense-mode frequency responses, demonstrating that the drive-mode resonant frequency is located inside the sense-mode flat region.

Consider the experimental results which were found in this example. The frequency responses of the two DOF sense-mode oscillator 12 and the 1-DOF drive-mode oscillator 14 were characterized under different pressure and temperature conditions in an MMR vacuum probe station. For the sense-mode characterization, one-port actuation and detection was utilized, where one probe was used to impose the driving AC signal plus the DC bias voltage on the gyroscope structure, and one probe was contacted with the sensing electrode of the sense-mode passive mass 18, $m_2$. Thus, the extracted frequency responses in the sense-mode are the response of the passive-mass, but the excitation force is also applied on the passive-mass. The acquired sense-mode frequency responses were then post-processed, in order to reflect the dynamics of the passive-mass when the active-mass is driven. In the sense-mode frequency response, a flat region of over 300 Hz was experimentally demonstrated as shown in the graph of FIG. 6. The two resonance peaks in the drive-mode frequency response were observed as $f_{x-n1}$=693 Hz and $f_{x-n2}$=940 Hz. When the drive and sense-mode frequency responses of the three DOF gyroscope 10 are investigated together, the drive mode resonant frequency is observed to be located inside the sense-mode flat region as shown in FIG. 6.

Consider now an experimental analysis of parametric sensitivity. In order to characterize the frequency response of the two DOF sense-mode oscillator 12 under different pressure and temperature conditions, electrostatic actuation and capacitive detection was utilized in an MMR vacuum probe station. A gyroscope structure with actuation electrodes attached to the sense-mode active mass 18 $m_2$ was designed and characterized. The frequency response was acquired using off-chip transimpedance amplifiers with a feedback resistor of $R_A$=1 MΩ connected to an HP Signal Analyzer in sine-sweep mode. Two-port actuation and detection was utilized, where one probe was used to impose the DC bias voltage on the gyroscope structure through the anchor 24, one probe was used to apply the AC drive voltage on the actuation port attached to the active mass 16, $m_1$, and the detection port on the passive mass 18, $m_2$, was directly connected to the transimpedance amplifier.

Figure 7A:
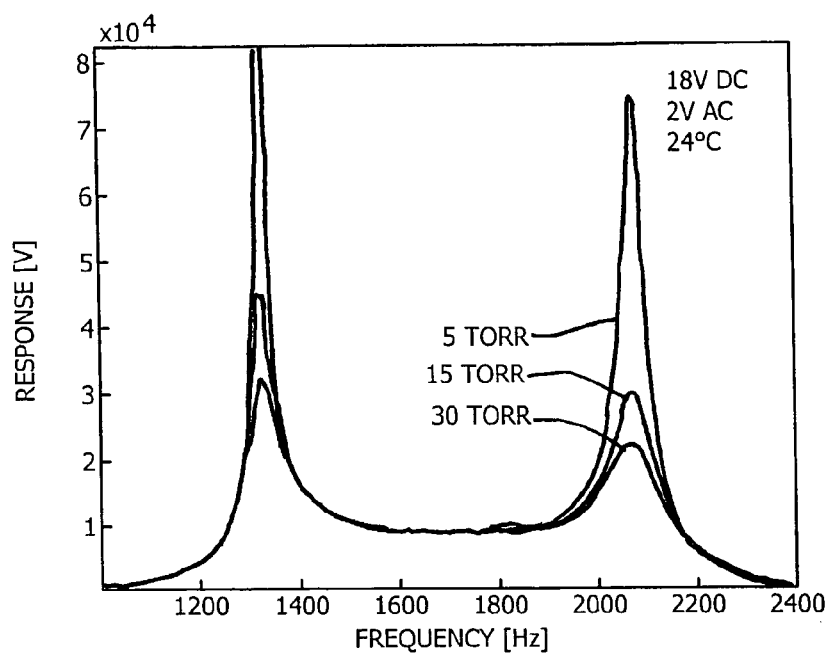
FIGS. 7a and 7b are graphs showing electrostatically acquired amplitude and phase response respectively with changing pressure values as a function of frequency.
Figure 7B:
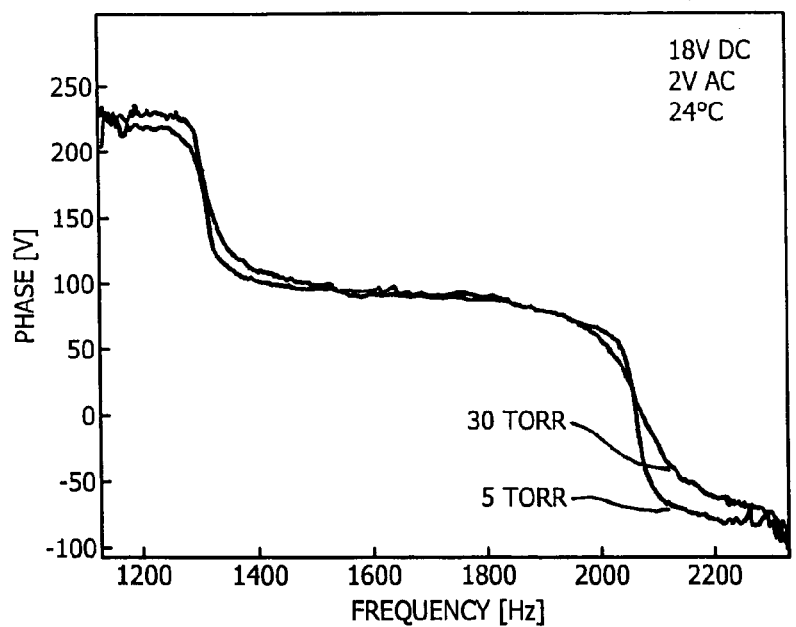

FIGS. 7a and 7b presents the experimentally measured amplitude and phase responses of the sense mode passive mass at 5, 15, and 30 Torr acquired in an MMR vacuum probe station, after numerical parasitic filtering. The oscillation amplitude in the two resonance peaks were observed to increase with decreasing pressures. However, the change in the response amplitude in the flat operating region is insignificant, as anticipated by the theoretical analysis. This experimentally demonstrates the damping insensitivity of the sense-mode response in the flat operating region. Furthermore, the phase of the sense-mode passive mass was observed to stay constant in the operating frequency band, while the phase changes were observed at the two resonance peaks as expected as shown in FIG. 7b.

Thus, it is experimentally verified that a constant phase response is achieved in the operating region, in contrast to the abrupt phase changes at the resonance peak of the conventional gyroscopes.

Figure 8:
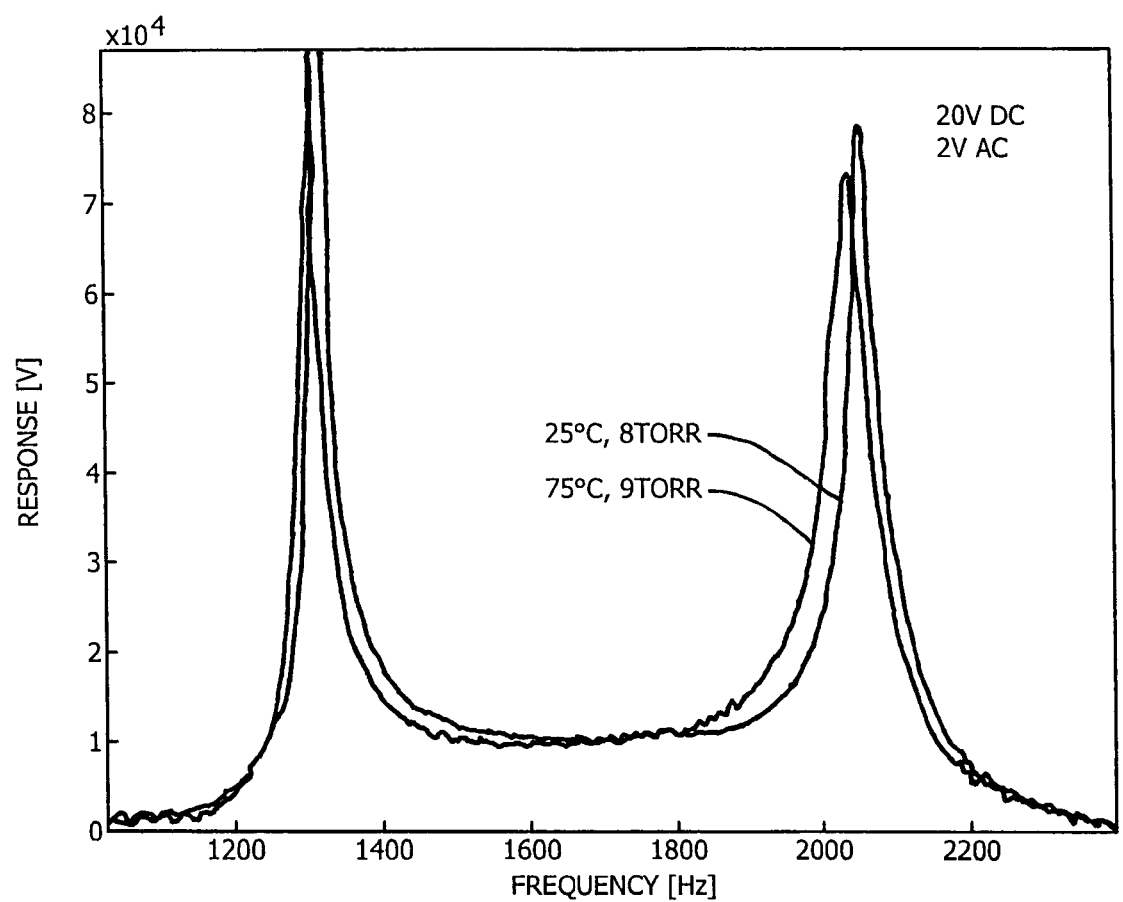
FIG. 8 is a graph of the frequency response of the sense-mode passive mass, at 25° C. and 75° C. The response gain at the operating region is observed to stay constant.
Figure 9:
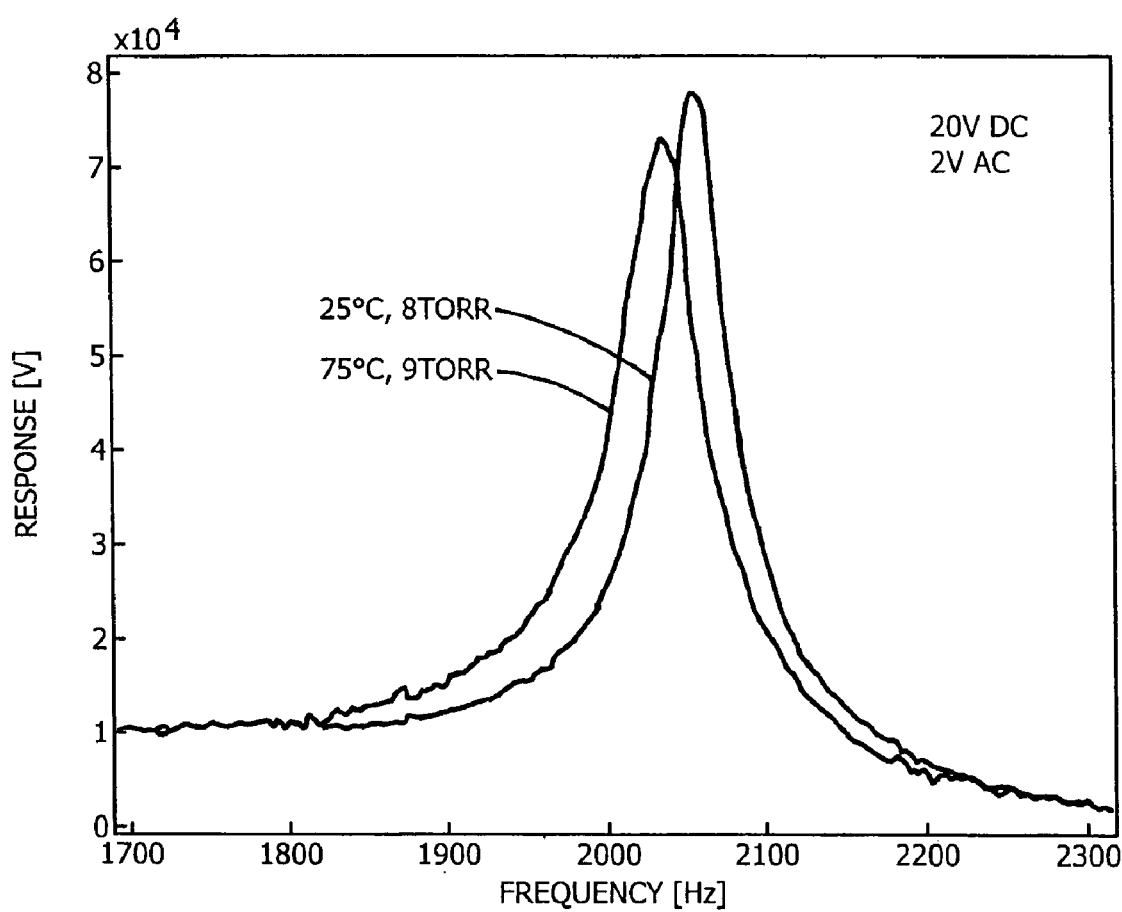
FIG. 9 is a graph showing the close-up of the frequency response of the sense-mode passive mass, at 25° C. and 75° C., showing the frequency shift at the resonance peak, and the constant response at the operating region.

Consider now the effect of temperature variations. The sensitivity of the gyroscope 10 to temperature variations was characterized by heating the vacuum chamber of the MMR probe station, and continuously monitoring the temperature of the sample using a solid-state temperature sensor attached to the stage carrying the sample. FIG. 8 is a graph which presents the capacitively acquired frequency response of the sensing element at the temperatures 25° C. and 75° C. The response amplitude in the flat operating region was observed to be less than 2% for the 50° C. variation in temperature, experimentally verifying the improved robustness against temperature variations. When the change in the response gain at the resonance peaks are considered as shown in FIG. 9, it is observed that the frequency shift due to the temperature change results in a maximum of over 40% drop in the gain. The response amplitude in the flat operating region is observed to remain unchanged also in FIG. 9.

Figure 10A:
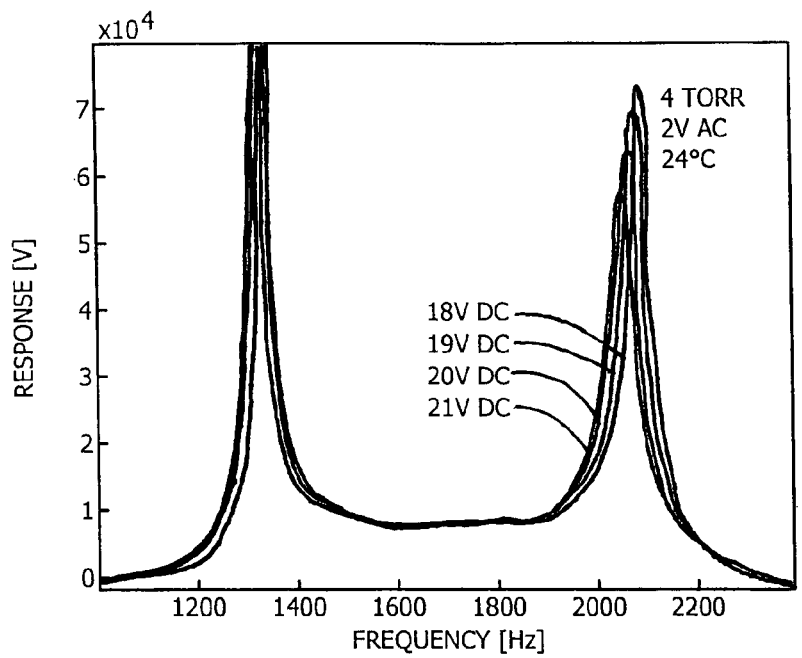
FIGS. 10a and 10b are graphs which show the electrostatically detected amplitude and phase response respectively of the sense-mode passive mass with changing DC bias.
Figure 10B:
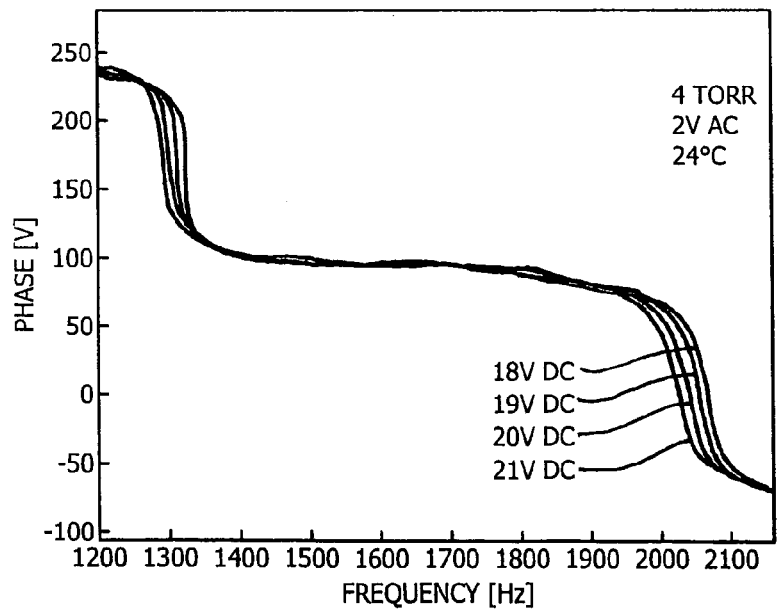

In order to observe the effects of larger stiffness variations on the system response, the frequency response of the sense-mode passive mass was acquired with different DC bias voltages. FIGS. 10a and 10b are graphs which presents the amplitudes and phases of experimental frequency response measurements for 18V to 21V DC bias at 4 Torr pressure. The electrostatic negative spring effect was observed to result in 30 Hz shift in the first resonance peak and 45 Hz shift in the second resonance peak, however, the response amplitude in the flat operating region was observed to change insignificantly.

Consider now a rate-table characterization of the invention. The synchronous demodulation technique was used to extract the angular rate response of the three DOF system 10 with two DOF sense-mode. The drive signal applied on the comb-drive actuators was 25V DC bias and 3V AC. The device was operated at resonance in the drive mode, at 752 Hz. The drive-mode amplitude was measured optically during the operation of the device as 5.8 μm, using a microscope attached to the rate-table platform.

A 20 kHz carrier signal was imposed on the gyroscope structure, and the output from the differential sense-capacitors was amplified and synchronously amplitude demodulated at the carrier signal frequency using a lock-in amplifier. The Coriolis signal was finally demodulated at the driving frequency.

Figure 11A:
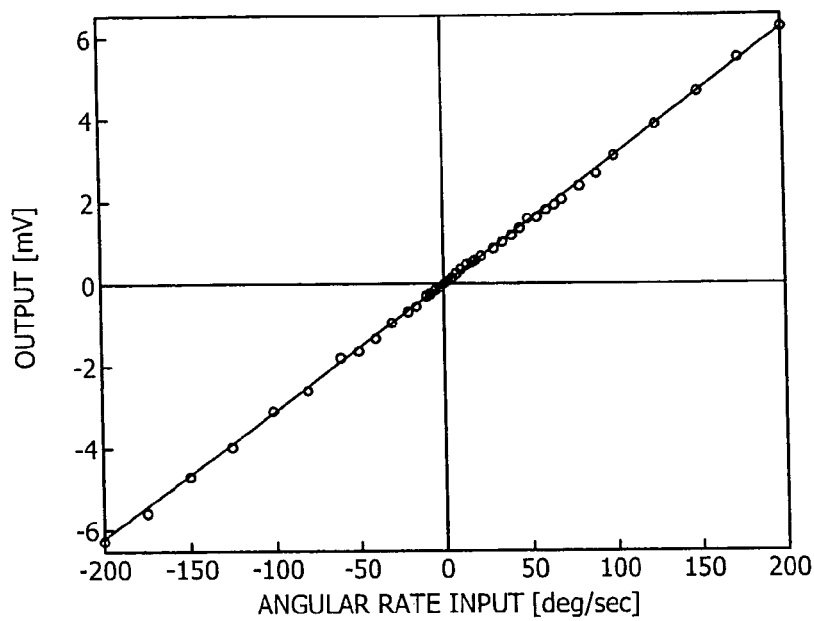
FIGS. 11a and 11b are graphs which show the angular-rate input vs. voltage output plot obtained from the three DOF gyroscope with two DOF sense-mode, in the −50°/s to 200°/s, and 0°/s to +25°/s input ranges respectively.
Figure 11B:
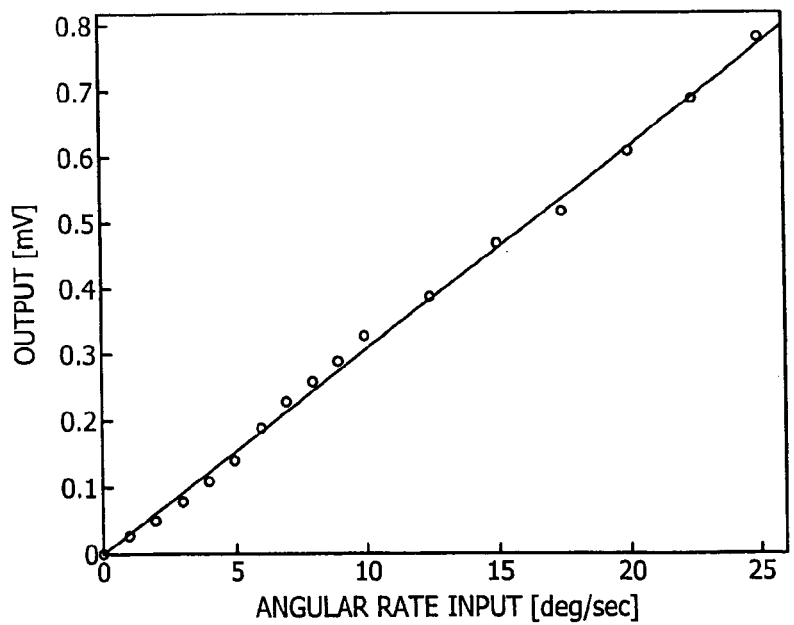

With this technique, a sensitivity of 0.0308 mV/°/s was experimentally demonstrated while the device was operated in the flat-region of the sense-mode frequency response as shown in the graphs of FIGS. 11a and 11b. The measured noise floor was 19.7 μV/√Hz at 50 Hz bandwidth, yielding a measured resolution of 0.64°/s/√Hz at 50 Hz bandwidth in atmospheric pressure.

In order to verify that robustness to parameter variations is achieved in the overall Coriolis response of a wide-bandwidth gyroscope, the three DOF gyroscope 10 with two DOF sense mode was characterized on the rate table in a thermally controlled chamber. When the temperature of the gyroscope was increased from 25° C. to 75° C. while keeping the excitation frequency constant at 752 Hz, the sensitivity of the gyroscope was observed to drop from 0.0308 mV/°/s to 0.0234 mV/°/s. This translates into 24.1% drop in the response gain. When the change in the drive-mode amplitude from 25° C. to 75° C. is investigated, it is seen that is changes from 5.8 μm to 4.3 μm; yielding a 25.9% change. Thus, it is demonstrated that the change in the gyroscope sensitivity is almost exactly equal to the drive-mode amplitude change (with 1.8% discrepancy); verifying the insensitivity of the sense-mode response to temperature variations.

Figure 12:
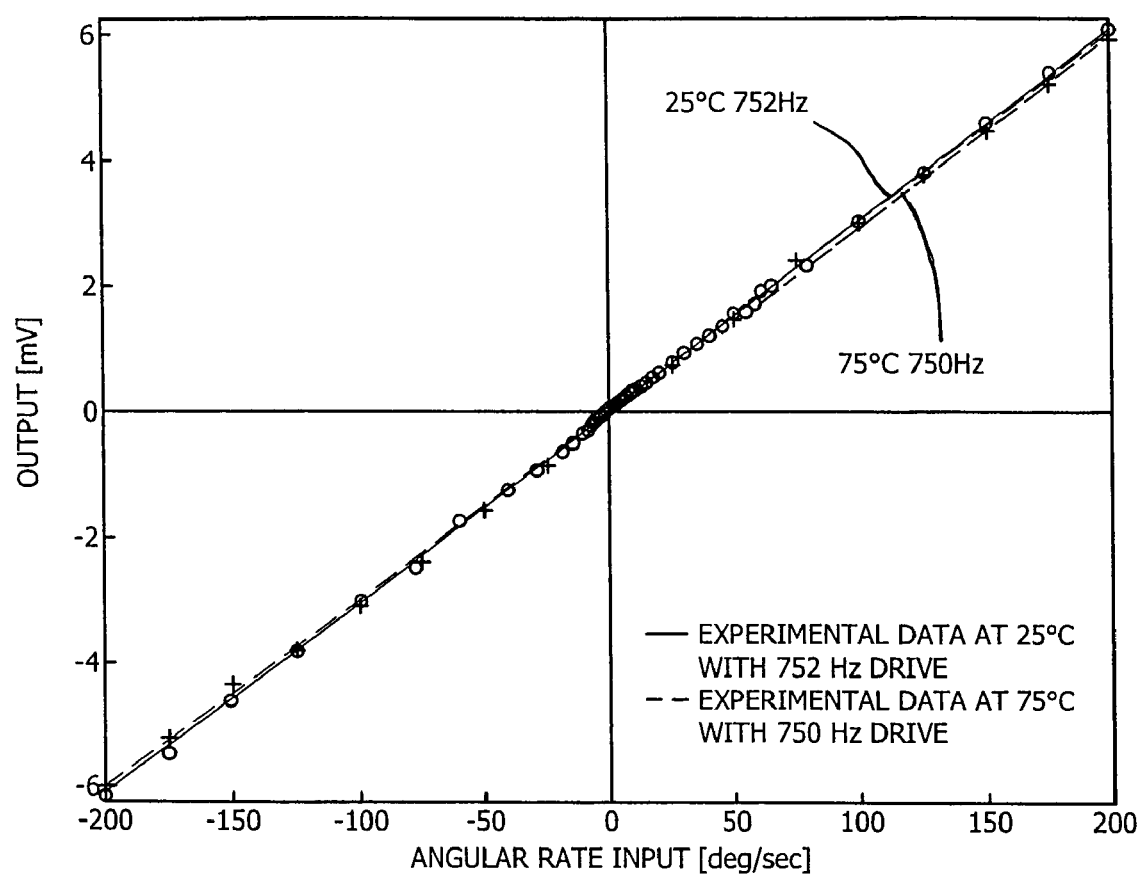
FIG. 12 is a graph of the measured angular-rate response of the three DOF gyroscope at 25° C. and 75° C., when the drive frequency is changed from 752 Hz to 750 Hz.

In order to confirm this result, the rate table characterization at 75° C. was repeated, this time changing the drive frequency to 750 Hz. At this frequency, the drive-mode amplitude was restored to 5.8 μm, and a sensitivity of 0.0303 mV/°/s was measured as shown in FIG. 12. Consequently, it was experimentally demonstrated that, a temperature variation from 25° C. to 75° C. results in only 1.62% change in the output of the wide-bandwidth gyroscope approach, verifying the improved robustness. At elevated temperatures, the linearity of the response was also observed to be preserved.

Compare the response of the illustrated embodiment with a conventional gyroscope. In order to compare the improved robustness of the proposed wide-bandwidth approach, a micromachined gyroscope with a conventional 1-DOF sense-mode was characterized under the same temperature variations and using the same signal conditioning electronics. When the temperature of the tested conventional gyroscope was increased from 25° C. to 75° C. while restoring the drive-mode amplitude to 12 μm, the sensitivity was observed to drop from 0.91 mV/°/s to 0.73 mV/°/s. Thus, a 50° C. temperature increase was observed to result in 19.8% sensitivity change in the conventional gyroscope, which is over 12.2 times larger than the wide-bandwidth gyroscope approach.

In summary one of the most prominent benefits of the three DOF system 10 with two DOF sense-mode is its compatibility with well-proven drive-mode control techniques, while the effect of parameter variations on the gain and phase of the sense-mode response is significantly suppressed. The fabricated bulk-micromachined prototypes were successfully operated as a gyroscope in the flat region of the sense-mode to measure angular rate with sufficient sensitivity and noise characteristics. With a 25V DC bias and 3V AC drive signal resulting in 5.8 μm drive mode amplitude, the gyroscope exhibited a measured noise-floor of 0.640/s/$\sqrt{Hz}$ over 50 Hz bandwidth in atmospheric pressure. The sense-mode response in the flat operating region was also experimentally demonstrated to be inherently insensitive to pressure, temperature and DC bias variations. The design concept was introduced using a z-axis implementation as an example. The concept is general, enabling x and y-axis implementations as well.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

For example, although the illustrated embodiment is shown and described as a planar vibratory or linear gyroscope, it is expressly contemplated that the same operational concepts of a three DOF system 10 with two DOF sense-mode oscillator could also be implemented in a torsional gyroscope by applying the principles taught in above.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A three-degrees of freedom (DOF) MEMS inertial micromachined gyroscope with a drive direction, a sense direction, and a direction perpendicular to the drive and sense directions comprising:

a 2-DOF sense-mode oscillator means having a frequency response curve with two resonant peaks in a sense mode, the 2-DOF sense-mode oscillator means for operating at a frequency in a generally flat region of a frequency response curve of the 2-DOF sense mode oscillator means between the two resonant peaks of the frequency response curve;

a 1-DOF drive-mode oscillator means for operating at resonance in a drive mode at a frequency in the flat region of the frequency response curve of the 2-DOF sense mode oscillator means to achieve amplified drive-mode amplitudes; and a planar substrate on which the 2-DOF sense-mode oscillator means and the 1-DOF drive mode oscillator means are disposed.

2. The gyroscope of claim 1 where the 2-DOF sense-mode oscillator means is comprised of two weakly coupled masses free to vibrate in two dimensions relative to the substrate in the sense mode.

3. The gyroscope of claim 1 where the 1-DOF drive-mode oscillator means comprises two weakly coupled masses together with a decoupling frame to which the two weakly coupled masses are in turn coupled, which masses and frame move together in the drive mode and which masses move independently of the frame and each other in the sense mode.

4. The gyroscope of claim 1 where the drive-mode oscillator means comprises a first mass and a frame structure coupled to the substrate and constrained to vibrate only in the drive direction relative to the substrate in the drive mode, where the first mass is also included within the sense-mode oscillator means and is coupled to the frame structure and is constrained to vibrate only in the sense direction with respect to the frame structure to minimize quadrature error and undesired electrostatic forces in the sense-mode due to drive-mode actuator imperfections.

5. The gyroscope of claim 4 where the 2-DOF sense-mode oscillator means is further comprised of a second mass, and where the 1-DOF drive-mode oscillator means is comprised of the frame structure, first mass and second mass, the frame structure, first and second masses vibrating together in the drive direction in the drive mode at a single peak resonance.

6. The gyroscope of claim 1 where the 2-DOF sense-mode oscillator means and the 1-DOF drive-mode oscillator means are stiff in a direction perpendicular to a plane of the substrate.

7. The gyroscope of claim 1 where the 2 DOF sense-mode oscillator means with the generally flat operation region between the two resonance peaks in a frequency response curve of the 2-DOF sense-mode oscillator means comprises means for ensuring that the sense-mode response amplitude and phase are insensitive to parameter fluctuations, resulting in robustness to residual stresses, variations in dimensions or material properties, and thermal fluctuations throughout operation time.

8. A method of operating a three-degrees of freedom (DOF) MEMS inertial micromachined gyroscope comprising:
    driving a 1-DOF drive-mode oscillator in a drive mode in a drive direction at resonance to achieve amplified drive-mode amplitudes; and
    simultaneously sensing motion of a 2-DOF sense-mode oscillator in a sense mode in a sense direction, the 2-DOF sense-mode oscillator having a frequency response curve with two resonance peaks and a generally flat region therebetween, the 2-DOF sense-mode oscillator being sensed in the generally flat frequency region between the two resonance peaks.

9. The method of claim 8 where driving the 1-DOF drive-mode oscillator comprises oscillating a second mass and oscillating a first mass in the drive direction in the drive mode, and constraining the second mass with respect to the first mass to oscillate relative to the first mass only in the sense direction in the sense mode, the first and second masses oscillating together in the drive direction in the drive mode at a single peak resonance.

10. The method of claim 8 further comprising:
    oscillating a frame structure only in the drive direction in the drive mode relative to a substrate on which the frame is disposed;
    where driving the 1-DOF drive-mode oscillator comprises oscillating a second mass, and oscillating a first mass, which second mass is constrained with respect to the first mass to oscillate relative to the first mass only in the sense direction in the sense mode, the first and second masses also oscillating together in the drive direction in the drive mode at a single peak resonance, and
    where oscillating the first mass coupled to the frame structure only in the sense direction in the sense mode with respect to the frame structure minimizes quadrature error and undesired electrostatic forces in the sense-mode due to drive-mode actuator mperfections.

11. The method of claim 8 where the 2-DOF sense-mode oscillator and the 1-DOF drive mode oscillator are stiff in a direction perpendicular to a plane which defines a substrate on which the drive-mode and sense-mode oscillators are disposed, so that driving the 1-DOF drive-mode oscillator and sensing with a 2-DOF sense-mode oscillator are substantially all in a plane parallel to the substrate.

12. The method of claim 8 where sensing with the 2-DOF sense-mode oscillator in the generally flat frequency region comprises insuring that the sense-mode response amplitude and phase are insensitive to parameter fluctuations resulting in robustness to in residual stresses, variations in dimensions or material properties, and thermal fluctuations throughout operation time.

13. An inertial sensor comprising a MEMS micromachined gyroscope, the gyroscope comprising:
    a two-degrees of freedom (2-DOF) sense-mode oscillator means for operating in a sense mode with a frequency response curve with two separate resonance peaks;
    a 1-DOF drive-mode oscillator means for operating at a resonance frequency in a drive mode to achieve amplified drive-mode amplitudes; and
    a planar substrate on which the 2-DOF sense-mode oscillator means and the 1-DOF drive-mode oscillator means are disposed,
    wherein the gyroscope is configured to have the 2-DOF sense-mode oscillator means operating in a frequency region between the two resonance peaks in the frequency response curve of the 2-DOF sense-mode oscillator means, and
    wherein the resonance frequency of the 1-DOF drive-mode oscillator means is also in said region between said two resonance peaks.

14. A three-degrees of freedom (DOF) MEMS inertial micromachined gyroscope with a drive direction, a sense direction, and a direction perpendicular to the drive and sense directions comprising:
    a planar substrate;
    a 2-DOF sense-mode oscillator disposed on the substrate and comprised of two weakly coupled masses free to vibrate in two dimensions relative to the substrate, the 2-DOF sense-mode oscillator having a frequency response curve with two resonant peaks and operating at a frequency in a flat region of its frequency response curve between the two resonant peaks of the frequency response curve;
    a 1-DOF drive-mode oscillator disposed on the substrate and comprised of the two weakly coupled masses together with a decoupling frame to which the two weakly coupled masses are in turn coupled, which masses and frame move together in the drive mode and which masses move independently of the frame and each other in the sense mode, the drive-mode oscillator operating at resonance in a drive mode at a frequency in the flat region of the frequency response curve of the 2-DOF sense mode oscillator to achieve amplified drive-mode amplitudes.

* * * * *